(12) United States Patent
Krause (10) Patent No.: US 8,701,349 B2
(45) Date of Patent: Apr. 22, 2014

(54) GUIDE ARRANGEMENT FOR A MOVABLE WINDOW PANE, IN PARTICULAR OF A MOTOR VEHICLE

(75) Inventor: Fritz Krause, Hergatz (DE)

(73) Assignee: Metzeler Automotive Profile Systems GmbH (DE)

(*) Notice: Subject to any disclaimer, the term of this patent is extended or adjusted under 35 U.S.C. 154(b) by 350 days.

(21) Appl. No.: 12/514,276

(22) PCT Filed: Nov. 9, 2007

(86) PCT No.: PCT/EP2007/062158
§ 371 (c)(1),
(2), (4) Date: Aug. 11, 2009

(87) PCT Pub. No.: WO2008/055982
PCT Pub. Date: May 15, 2008

(65) Prior Publication Data
US 2009/0309391 A1  Dec. 17, 2009

(30) Foreign Application Priority Data

Nov. 10, 2006 (DE) .......................... 10 2006 053 095

(51) Int. Cl.
*E05F 11/38* (2006.01)
(52) U.S. Cl.
USPC ................................ 49/374; 49/441; 49/475.1
(58) Field of Classification Search
USPC ............. 49/374, 502, 440, 441, 495.1, 489.1, 49/475.1, 492.1, 348, 349, 352
See application file for complete search history.

(56) References Cited

U.S. PATENT DOCUMENTS 4,240,227 A * 12/1980 Hasler et al. .................... 49/348
4,483,100 A * 11/1984 Blankenburg et al. .......... 49/352

(Continued)

FOREIGN PATENT DOCUMENTS

DE  2809721 B1  9/1979
DE  3320157 A1  12/1984

(Continued)

OTHER PUBLICATIONS

Patent Coooperative Treaty, Written Opinion and International Search Report, Dated Mar. 5, 2008, 12 pages.

*Primary Examiner* — Katherine Mitchell
*Assistant Examiner* — Catherine A Kelly
(74) *Attorney, Agent, or Firm* — Brian B. Shaw, Esq.; Thomas B. Ryan, Patent Agent; Harter Secrest & Emery LLP (57) ABSTRACT

The invention relates to a guide arrangement (10), in particular for a motor vehicle door, which comprises at least one movable window pane (20, 120), at least one guide part (30, 130) and at least one receptacle (40, 140) for the guide part (30, 130), wherein the guide part (30, 130) or the receptacle (40, 140) is fastened to the window pane (20, 120) and the guide part (30, 130) extends, at least in sections, into the receptacle (40, 140) in a direction which runs substantially perpendicular to the plane of the window pane (20, 120). The invention also relates to a method for assembling a guide arrangement (10) of said type.

21 Claims, 6 Drawing Sheets

(56) References Cited

U.S. PATENT DOCUMENTS

| | | | |
|---|---|---|---|
| 4,932,161 A * | 6/1990 | Keys et al. | 49/490.1 |
| 4,999,951 A * | 3/1991 | Keys et al. | 49/478.1 |
| 5,054,242 A | 10/1991 | Keys et al. | |
| 5,086,589 A * | 2/1992 | dibenedetto | 49/502 |
| 5,613,325 A * | 3/1997 | Mariel | 49/404 |
| 6,412,225 B1 * | 7/2002 | McManus | 49/381 |
| 6,820,372 B2 * | 11/2004 | Nozaki | 49/498.1 |
| 2006/0059799 A1 * | 3/2006 | Zimmer et al. | 52/204.1 |

FOREIGN PATENT DOCUMENTS

| | | |
|---|---|---|
| DE | 3522811 A1 | 1/1987 |
| DE | 102005053572 A1 | 5/2007 |
| EP | 0308377 A1 | 3/1989 |
| EP | 0423590 A1 | 6/1991 |
| EP | 1464524 A2 | 10/2004 |

* cited by examiner

GUIDE ARRANGEMENT FOR A MOVABLE WINDOW PANE, IN PARTICULAR OF A MOTOR VEHICLE

The present invention relates to a guide arrangement for at least one movable window pane in particular a window pane of a motor vehicle.

Motor vehicles are commonly equipped with a number of doors fitted with a window pane that is able to be raised and lowered. Sealing arrangements with a number of elastic sealing lips are generally provided for the guiding and sealing of such movable window panes. As the window pane is raised it is guided with a certain amount of play by the sealing arrangement, which is fastened to the door frame at the side of the window aperture. It is also known for a decorative strip to be provided on the outer side of the sealing arrangement which serves to give the sealing arrangement an appropriate, aesthetically appealing appearance.

Such sealing arrangements have proved to have the disadvantage that when the window pane is in the closed position there is a projection in the upper area of the window pane at the transition to the roof frame where there is a distance of up to one centimeter or more between the plane of the outer surface of the window pane and the plane of the outer edge of the roof frame or its sealing element. A projection of this kind occurs particularly with doors without frames, that is to say doors which do not have an upper, horizontal, door-frame section.

DE 35 22 811 A1 discloses a window-pane guide with a fastening leg of a U-shaped guide rail bonded along an inside edge of each retractable window in the vicinity of the B-pillar for guiding the window pane downwards. A protruding guide leg of the guide rail is engaged in a groove of the receiving rail of the frame arranged on the window pane. In addition, DE 33 20 157 A1 discloses a glass sheet with a metal support glued to it in the shape of a supporting/guiding rail with two U-shaped profiles. The leg of the U-shaped profile is glued to the surface of the glass sheet with an adhesive.

Finally DE 10 2005 053 572 A1 discloses an arrangement for guiding or holding the side of a retractable window pane of a motor-vehicle door with a seal arranged on the door frame on which the window pane comes to rest. A profile element, arranged at least in areas along the lateral end section of the window pane in the direction of movement of the window pane, is engaged in a guiding groove of the sealant for guiding or retaining the window pane. In order to hold the profile element in position a further constructional element, a profile rail, is required, thus making assembly labour-intensive.

The object of the current invention, in addition to enabling the assembly of the guide arrangement to be simple, is to create a flush transition between the border areas of the window pane and the sealing fitted to the frame surrounding the window pane.

The object is solved in a guide arrangement according to claim 1 conceived in particular for a motor-vehicle door provided with at least one movable window pane, at least one guide part and at least one retainer for the guide part, wherein the guide part or the retainer is secured on the window pane and the guide part extends, at least in sections, into the retainer which is positioned in a direction substantially perpendicular to the plane of the window pane.

What is to be understood under a guide arrangement in the meaning of the invention is a constructional part of appropriate dimensions which works in conjunction with the retainer to guide the window pane as it is being raised and lowered. In this arrangement the guide part is preferably configured as an extension lug, projection, elevation, nose or finger. The retainer is correspondingly shaped to guide the guide part in the appropriate way. It is preferable for the retainer also to perform a sealing function at the same time. Preferably, the retainer should have a cross-sectional shape which is open to one side, as in a U-shaped cross-section, for example.

The present application primarily describes a first variant of the guide arrangement in which the guide part is fastened to the window pane. Alternatively, as a second variant, the arrangement of the guide part and the retainer could be functionally reversed, that is to say, the retainer may be fastened to the window pane. The preferred embodiments described below as examples of the first variant are also to be looked upon, with the appropriate changes, as possible second variants.

In the solution according to the invention, it is possible to obtain a flush transition between the outer surface of the window pane and an outer edge of the adjoining roof frame, and/or a flush alignment of two neighbouring window panes arranged substantially in the same plane, as in the case, for example, of the window panes of a front and a rear door of a motor vehicle. This solution makes it possible, for example, to arrange a compact spacing profile and/or one or more decorative strips between the two neighbouring end-faces of the window panes. The present invention also enables an arrangement of such decorative strips so as to achieve a flush transition between the outer surface of the front and rear window panes and the decorative strip positioned between them. In this way, it becomes possible to achieve an aesthetically appealing design of the front- and rear-door area.

What is more, the arrangement according to the present invention facilitates easier assembly. The guide part can be introduced, pushed, inserted or pressed into the retainer in a direction that is essentially perpendicular to the plane of the window pane; in other words, it is no longer necessary to go to the trouble of feeding in the window pane in a direction essentially parallel to the plane of the window pane. This enables the assembly process to be automated, which in turn enables the overall production costs to be reduced.

In a preferred embodiment the guide part and/or the retainer are shaped in such a way that the guide part can be introduced into the retainer in a direction that is substantially perpendicular to the plane of the window pane. In other words, an appropriate geometric shaping of the retainer and/or the guide part can be foreseen and permits a variety of different cross-sectional configurations.

It is advantageous for the retainer to comprise a retaining channel and the guide part to comprise a projection which is guided along the retaining channel as the window pane is moved. The projection is preferably of T-shaped cross-section. It is also preferable for the projection to be shaped as a guide bar which extends longitudinally. For example, the guide bar and the retainer should have about the same length and should be oriented substantially in the direction of movement of the window pane. Alternatively, the projection can be made up of a number of elements arranged along the longitudinal line.

In a preferred embodiment the projection has a guide arm which extends in a direction substantially perpendicular to the plane of the window pane.

The projection can also have an end section which extends in a direction substantially parallel to the plane of the window pane. It is preferable for the guide arm and the end section to form a projection that is T-shaped in cross-section. The end section can be provided with at least one first end and one second end. These ends can be embraced e.g. by at least one of the sealing lips arranged on the retainer.

In a preferred embodiment the end section and/or the guide arm can be in contact with the retainer as the guide part is guided along the retainer.

Preferably, the guide part has a fastening section which is adhesively and/or positively bonded with the window pane.

In order to provide a large fastening area, the fastening section preferably extends substantially parallel to the plane of the window pane and/or substantially parallel to the end section.

It is preferable for the fastening section to be attached, and preferably glued, to the inner side of the window pane. It is advantageous and preferable for the fastening section to be attached exclusively to the inner side of the window pane.

In a preferred embodiment the retainer has a U-shaped cross-section with at least a base and two limbs. It is also possible for the retainer to be provided with a hollow chamber and/or at least one sealing lip. In this way, the retainer can also perform a sealing function.

It is preferable for at least one sealing lip to have contact with the end section and/or the guide arm. Furthermore, the guide part can be shaped so that it provides at least one guide channel for at least one sealing lip.

In a preferred development, the retainer is made to be elastically deformable, at least in part. Here it is advantageous for the elastic areas to be in those areas which operate in conjunction with the guide part. These areas, for example, could be the sealing lip or lips.

The retainer is preferably made of an elastomer material, and preferably is extruded from a thermoplastic elastomer or ethylene-propylene-diene-rubber. To provide appropriate sliding properties, the retainer and in particular at least one of the sealing lips is to have a friction-reducing flock surface or coating.

A preferred further development is achieved with a fastening unit for securing the retainer into a rigid constructional part. This fastening unit can be at least one fastening clip and/or an adhesive layer. Such a fastening clip for example, has a retaining end and a mushroom-shaped head. The fastening clip is preferably pushed through a hole in the retainer, in particular in the base, and securely engages in the rigid constructional part.

In order to create an appealing appearance, the window pane has a decorative coating, in particular a ceramic coating, on the outside or on the inside. This enables the adhesive layer on the fastening section of the guide part for attaching the guide part to the window pane to be optically hidden. Alternatively, it is also possible to provide the window pane with an etched area.

In a further preferred embodiment, the guide arrangement includes a rigid constructional part with an approximately U-shaped cross-section which serves to hold the retainer. Preferably, the rigid constructional part provides a positive seating for the retainer. The rigid constructional part can be provided with a decorative strip to create an appropriately appealing appearance. The rigid constructional part is preferably formed by a frame section of a vehicle door.

A further preferred variant of the guide arrangement according to the invention is configured so that a first guide part and a first retainer for the first guide part are provided for guiding a first window pane wherein the first guide part is attached to the first window pane. In addition, a second guide part and a second retainer for the second guide part are provided for guiding a second window pane wherein the second guide part is attached to the second window pane. In other words, it is essentially a guide arrangement consisting of two guide arrangements of the kind described above positioned next to each other.

In a preferred embodiment of this guide arrangement, the window panes extend essentially in one plane whereby the two end-faces of the window panes facing each other and extending transversely, in particular perpendicular to this said plane, are positioned at a prescribed distance from each other. In this way it is possible to achieve a flush transition between the window panes. The distance between the end-faces of the window panes which face each other is less than 20 mm, in particular less than 10 mm. In further preferred embodiments, this distance is less than 5 mm.

A further embodiment makes provision for at least one decorative strip between the two window panes extending in the same plane. It is preferable for the outer surfaces of the window panes and of at least one decorative strip to lie substantially in the same plane. In this way it is possible to achieve a flush transition from the first to the second window pane. Thus, the side area of a motor vehicle can be designed so that the outer surfaces of the window pane of the front door and of the window pane of the rear door and of any decorative strip positioned between them in the area of the B-pillar can all lie in the same plane.

What is more, the solution of the task in accordance with claim 19 in which a method is provided for the assembly of a guide arrangement in particular for assembly on a motor-vehicle door wherein the guide arrangement comprises at least one movable window pane, at least one guide part and at least one retainer for the guide part and in which the guide part or the retainer is attached to the window pane and the guide part is introduced into the retainer in a direction essentially perpendicular to the plane of the window pane.

In other words, the guide part for the mutual positioning of the guide part and retainer is such that the guide part, or at least a section of the guide part, is introduced, pushed or pressed into the retainer by a movement of the window in a direction essentially perpendicular to the plane of the window. Here it is not necessary for the entire insertion process to be performed exclusively in this direction, but part of this insertion can also be achieved in a different direction to the one previously mentioned, for example in a direction at an oblique angle to the plane of the window pane.

In a preferred development of the method, the guide part is introduced into the retainer so that at least one of the sealing lips located on the retainer is in contact with the guide part. This applies particularly when there is movement of the window pane. In this way the sealing function can also be fulfilled. In addition, the guide part can be introduced into the retainer so that at least one sealing lip can extend into the guide channel formed or provided by the guide part.

To enable the guide arrangement to be secured easily, a fastening clip is pushed through a hole in the retainer and locks the retainer to a rigid constructional part.

The invention will now be further explained with reference to the following figures.

The FIGS. 1-5 show various views of a motor vehicle with a front and a rear door. The front door comprises a window pane 20 and a door frame in the form of a rigid constructional part 60. The rear door comprises a window pane 120 and a door frame in the form of a rigid constructional part 160. In addition, the figures also show a B-pillar 80.

Figure 1:
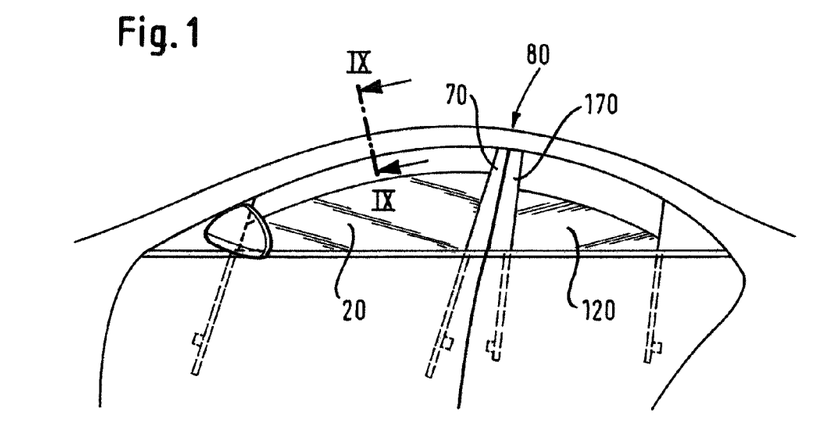
FIGS. 1 to 5 several views of a motor vehicle with an guide arrangement according to the invention.
Figure 2:
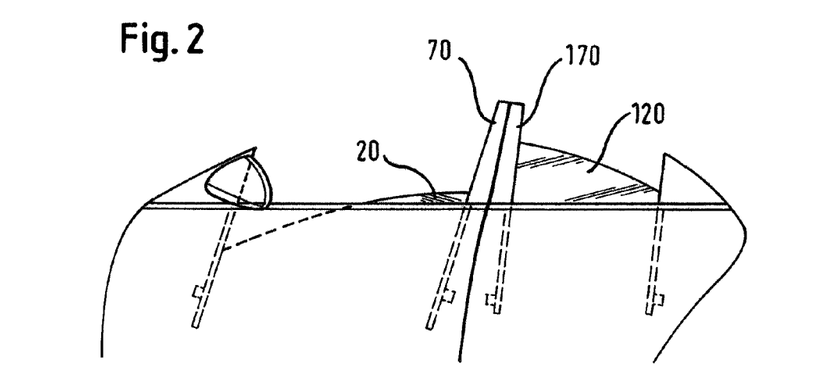
Figure 3:
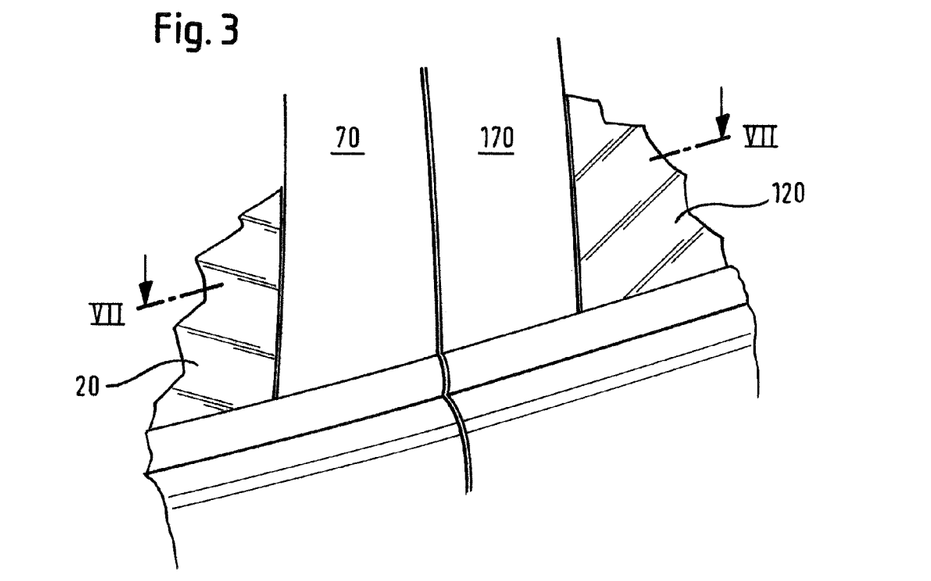
Figure 7:
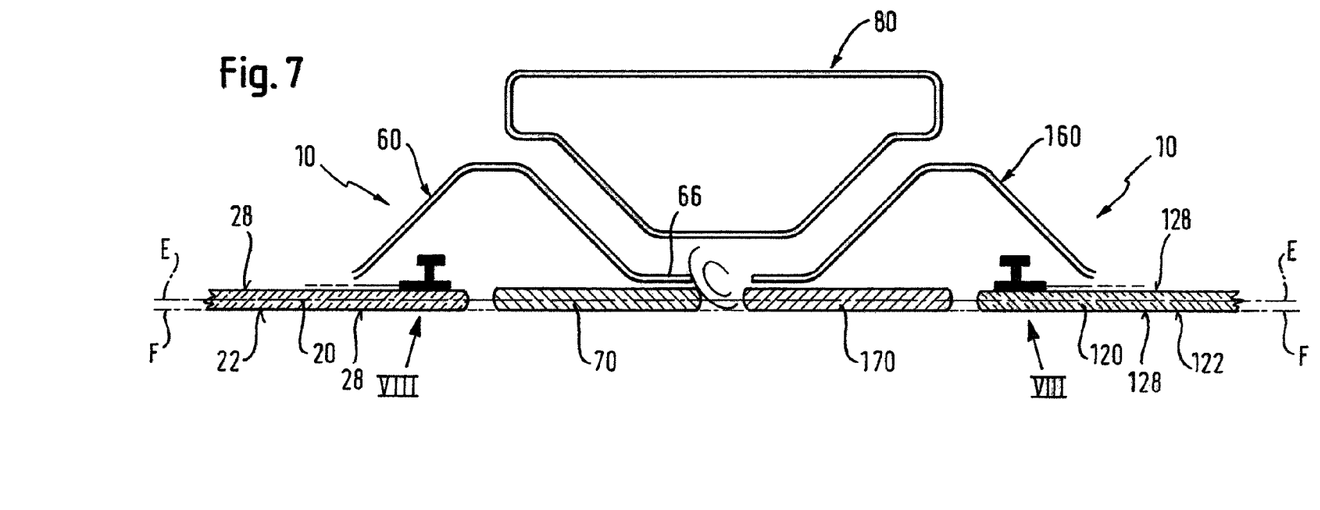
FIG. 7 a cross-section along the dot-and-dash line VII-VII in FIG. 3.

As can be seen in particular in FIGS. 3 and 7, in a first variant the window panes 20, 120 and the decorative strip 70, 170 are flush with each other. The window panes 20, 120 and the decorative strips 70, 170 extend substantially in a plane E which extends essentially in the vertical direction. In particular the outer surfaces 22, 122 of the window panes 20, 120 and the outer surfaces of the decorative strips 70, 170 are positioned so that all these surfaces extend along one plane F.

Figure 4:
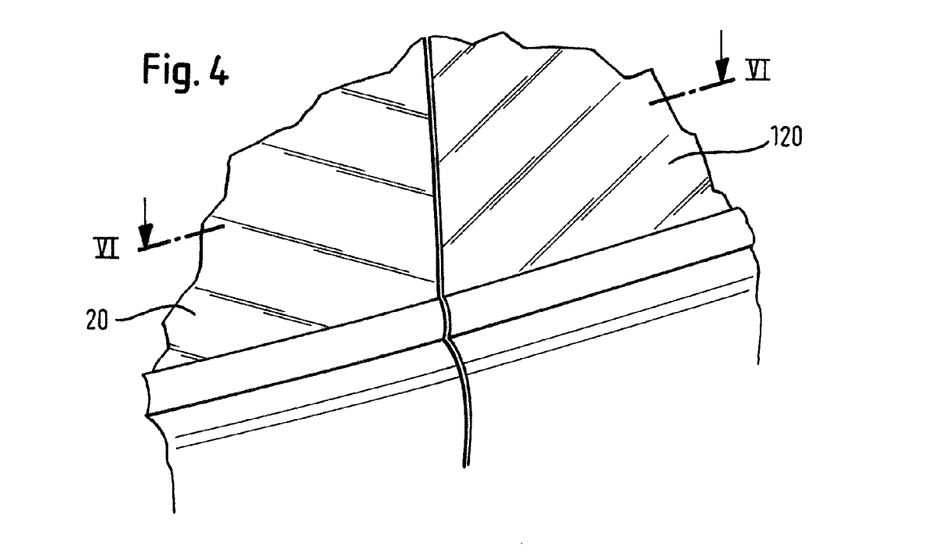
Figure 5:
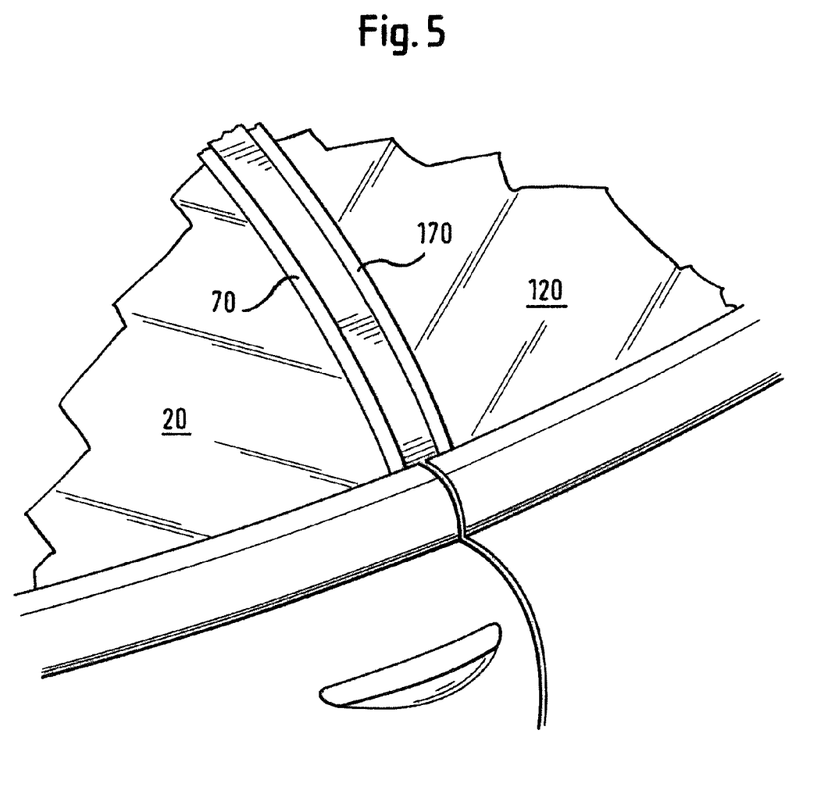
Figure 6:
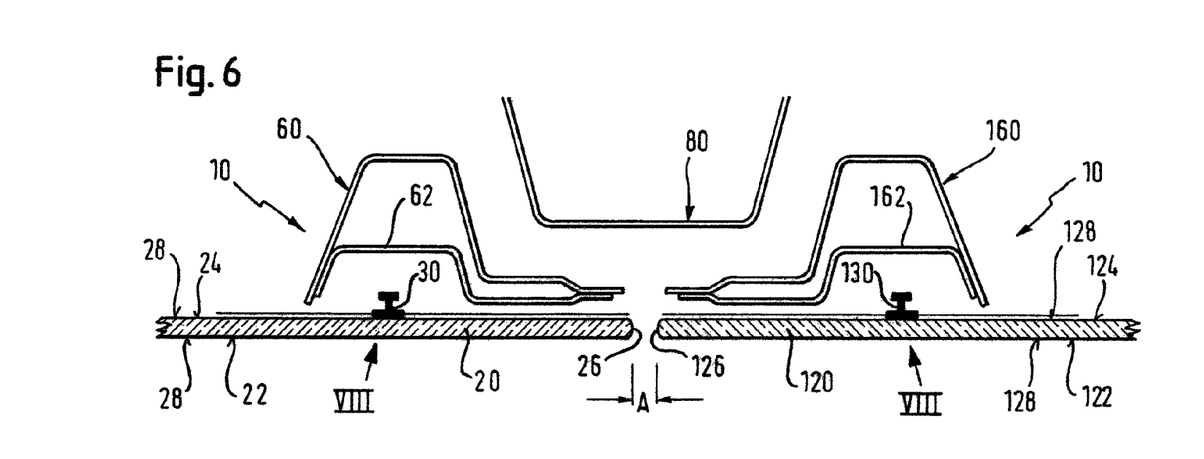
FIG. 6 a cross-section along the dot-and-dash line VI-VI in FIG. 4.

A second variant according to FIGS. 4 and 6 differs from the first variant in that no decorative strips are provided between the window panes 20, 120. The end-faces 26, 126 of the two window panes 20, 120 are positioned at a distance A from each other which is, for example, less than ten millimeters, in particular is less than 5 millimeters.

In the variant according to FIGS. 3 and 7 as well as in the variant according to FIGS. 4 and 6 the door frames are in the form of rigid constructional parts 60, 160 and the B-pillar 80 are positioned so that, when viewed from the outside of the motor vehicle, the window panes 20, 120 pass in front of the B-pillar 80. This gives an appealing optical effect.

Figure 8:
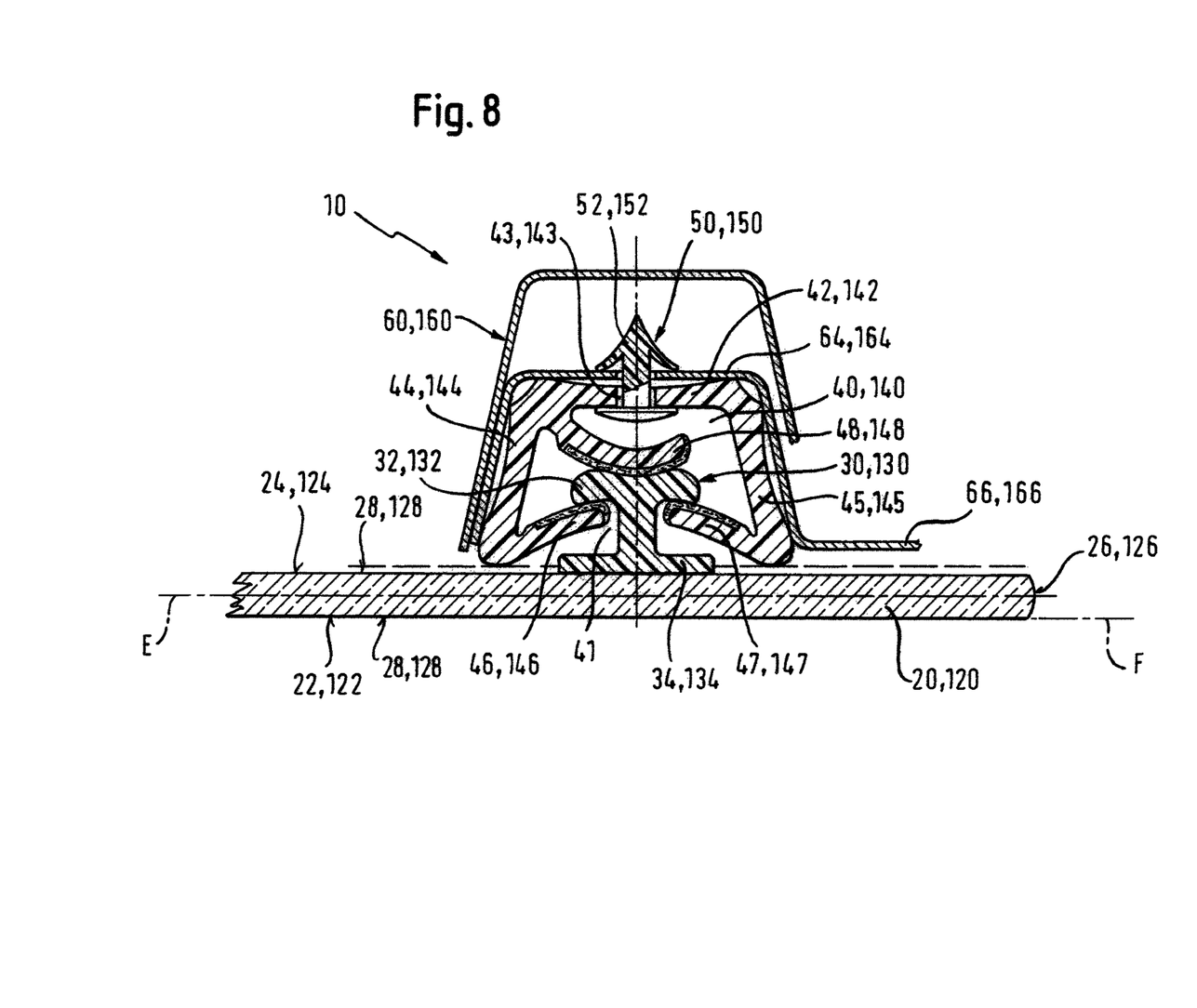
FIG. 8 a enlarged view of the section identified by VIII in FIG. 6 showing a cross-section of the guide arrangement according to the invention, and FIG. 9 a cross-section along the dot-and-dash line IX-IX in FIG. 1.

A guide arrangement 10 is provided for guiding each of the window panes 20, 120 and each of these guide arrangements 10 is constructed from the same constituent parts. For the sake of simplicity, the guide arrangement 10 for guiding the window pane 20 will now be explained in more detail with reference to FIG. 8:

The guide arrangement comprises a guide part 30 and a retainer 40 for the guide part 30. The retainer 40 has three sealing lips 46, 47, 48, which, in the mounted position, seal against the guide part 30.

To facilitate the easy assembly of the guide part 30 and the retainer 40, both these parts are shaped in such a way that the guide part 30 can be introduced into the retainer 40 in a direction substantially perpendicular to the plane of the window pane 20.

The guide part 30 is provided with a projection 32 which extends in a direction substantially perpendicular to the plane of the window pane 20.

This projection 32 comprises a guide arm 35 and an end section 36. The guide arm 35 extends in a direction substantially perpendicular to the plane of the window pane 20, whereas the end section 36 extends in a direction substantially parallel to the plane of the window pane 20. In other words, the guide arm 35 and the end section 36 form a T-shaped projection 32. The end section 36 has a first end 37 and a second end 38 which are each attached at one end to the guide arm 35 and at the other end are free.

When the guide part 30 and the retainer 40 are in the assembled position, the end section 36 and/or the guide arm 35 is in contact with the sealing lips 46, 47, 48 of the retainer 40. In this position the sealing lip 46 extends into a guide channel 39 formed by the first end 37, the guide arm 35 and the fastening section 34, and contacts and seals against a side of the first end 37 facing the inner side 24. In the same way, the sealing lip 47 extends into a guide channel 39 formed by the second end 38, the guide arm 35 and the fastening section 34, and contacts and seals against a side of the second end section 38 facing the inner side 24. Alternatively, or in addition, it is also possible that at least one of the sealing lips 46, 47 contacts the guide arm 35. Furthermore, the sealing lip 48 contacts the side of the end section 36 facing away from the inner side 24.

The fastening section 34 of the guide part 30 is adhesively bonded with the window pane 20. In the embodiment according to FIG. 8 the fastening section 34 is glued to the inner side 24 of the window pane 20 and extends substantially parallel to the plane of the window pane 20 respectively parallel to the end section 36. In the area of the fastening section 34 there is a decorative ceramic coating 28 on the outer side 22 of the window pane 20.

The retainer 40 as a whole forms a guide channel 41 for the guide part 30 and comprises a base 42 and two adjoining limbs 44, 45. At the ends of the limbs 44, 45, facing towards the window pane 20 are the sealing lips 46, 47. The further sealing lip 48 extends from the transition region between the base 42 and the limb 44.

The retainer 40 made from an elastically deformable material fits positively into a frame section 62 of the rigid constructional part 60. The frame section 62 comprises a first flange section 64 and a second flange section 66. A hole 43 in the base 42 serves to allow a fastening means 50 in the form of a fastening clip 52 to be pushed into the hole 43 in the base 42 so that a retaining end of the fastening clip 52 locks onto the flange section 64. The decorative strip 70 can be fastened directly or indirectly to the second flange section 66 as is to be seen in FIG. 7.

The guide arrangement 10 enables the movable window pane 20 to be guided properly, in particular because the guide part 30 positioned, and preferably bonded, on the inner side 24 is guided by means of the projection 32 in the retaining channel 41. As it is guided, the sealing lips 46, 47, 48 seal against the projection and, thus, at the same time perform a sealing function.

The embodiments described above of a guide arrangement 10 for guiding a window pane 20 also apply analogously to a guide arrangement 10 for the guiding of a window pane 120.

Figure 9:
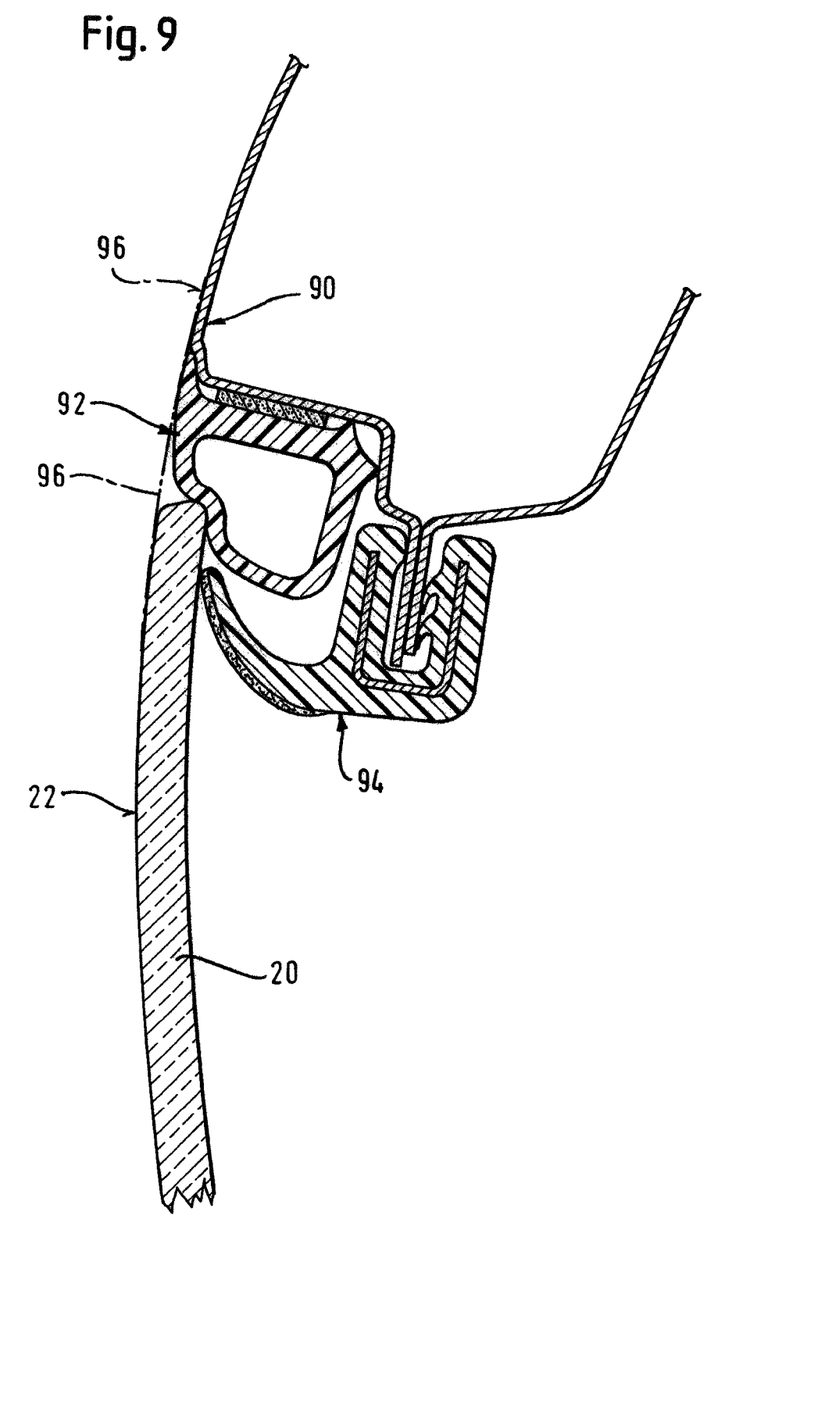

Finally, FIG. 9 shows a cross-section of the abutment area between the upper end of the window pane 20 and a roof frame 90. Here, too, there is a flush transition between the outer surface 22 of the window pane 20 and the outer edge 96 of the roof frame 90 on which two seals 92, 94 are provided.

LIST OF REFERENCES

| | |
|---|---|
| 10 | guide arrangement |
| 20 | window pane |
| 22 | outer surface |
| 24 | inner surface |
| 26 | end-face |
| 28 | decorative coating |
| 30 | guide part |
| 32 | projection |
| 34 | fastening section |
| 35 | guide arm |
| 36 | end section |
| 37 | first end |
| 38 | second end |
| 39 | guiding channel |
| 40 | retainer |
| 41 | channel |
| 42 | base |
| 43 | hole |
| 44 | limb |
| 45 | limb |
| 46 | sealing lip |
| 47 | sealing lip |
| 48 | sealing lip |
| 50 | fastening unit |
| 52 | fastening clip |
| 60 | rigid constructional part |
| 62 | frame section |
| 64 | flange section |
| 66 | flange section |

-continued

| | |
|---|---|
| 70 | decorative strip |
| 80 | B-pillar |
| 90 | roof frame |
| 92 | seal |
| 94 | seal |
| 96 | outer edge |
| E | plane |
| F | plane |
| A | distance |
| 120 | window pane |
| 122 | outer surface |
| 124 | inner surface |
| 126 | end-face |
| 128 | decorative coating |
| 130 | guide part |
| 132 | projection |
| 134 | fastening section |
| 135 | guide arm |
| 136 | end section |
| 137 | first end |
| 138 | second end |
| 139 | guide channel |
| 140 | retainer |
| 141 | channel |
| 142 | base |
| 143 | hole |
| 144 | limb |
| 145 | limb |
| 146 | sealing lip |
| 147 | sealing lip |
| 148 | sealing lip |
| 150 | fastening unit |
| 152 | fastening clip |
| 154 | adhesive layer |
| 160 | rigid constructional part |
| 162 | frame section |
| 164 | flange section |
| 166 | flange section |
| 170 | decorative strip |

The invention claimed is:

1. A guide arrangement for window panes of a motor vehicle with a first movable window pane having a first outer surface, a first inner surface, and a first end face, and a second movable window pane having a second outer surface, a second inner surface, and a second end face, wherein the first and second window panes extend essentially in a plane (E) and wherein the first end face of the first window pane and the second end face of the second window pane are arranged opposite, and at a distance (A) from, one another; comprising:
a first guide part fastened to the first window pane and a second guide part fastened to the second window pane;
a first receptacle for the first guide part having a first receiving channel, and a second receptacle for the second guide part having a second receiving channel, wherein the first receptacle has at least two elastically deformable first sealing lips that extend into the first receiving channel otherwise formed by the first receptacle and the second receptacle has at least two elastically deformable second sealing lips that extend into the second receiving channel otherwise formed by the second receptacle;
a first rigid constructional part in which the first receptacle is positively accommodated and a second rigid constructional part in which the second receptacle is positively accommodated, the first and second rigid constructional parts both being U-shaped in cross section within a reference plane that extends perpendicular to the plane (E);
the first guide part further comprising a first projection and a first fastening section, the first fastening section being attached to the first inner surface of the first window pane;
the second guide part further comprising a second projection and a second fastening section being attached to the second inner surface of the second window pane;
wherein the first projection comprises a first guide arm, extending essentially perpendicular to the plane (E), and a first end section, extending in a direction that is essentially parallel to the plane (E);
wherein the second projection comprises a second guide arm, extending essentially perpendicular to the plane (E), and a second end section, extending in a direction that is essentially parallel to the plane (E);
wherein the first guide arm, the first end section and the first fastening section of the first guide part form a first guiding channel for one of the first sealing lips of the first receptacle;
wherein the second guide arm, the second end section and the second fastening section of the second guide part form a second guiding channel for one of the second sealing lips of the second receptacle;
wherein the first guide part extends into the first receptacle in a direction that is essentially perpendicular to the plane (E) so that one of the first sealing lips of the first receptacle engages in the first guiding channel and forms a seal against at least one of the first end section and the first guide arm, and another of the first sealing lips of the first receptacle forms a seal against a side of the first end section facing away from the first inner surface of the first window;
wherein the second guide part extends into the second receptacle in a direction that is essentially perpendicular to the plane (E) so that one of the second sealing lips of the second receptacle engages in the second guiding channel and forms a seal against at least one of the second end section and the second guide arm, and another of the second sealing lips of the second receptacle forms a seal against a side of the second end section facing away from the second inner surface of the second window;
wherein, upon movement of the first window pane, the first projection is guided along the first receiving channel by the first sealing lips of the first receptacle; and
wherein, upon movement of the second window pane, the second projection is guided along the second receiving channel by the second sealing lips of the second receptacle.

2. The guide arrangement according to claim 1 wherein the first guide arm and the first end section form a T-shaped cross-section of the first projection in the reference plane normal to the plane (E), and the second guide arm and the second end section form a T-shaped cross-section of the second projection in the reference plane normal to the plane (E).

3. The guide arrangement according to claim 1 wherein the first fastening section extends essentially parallel to at least one of the plane (E) and the first end section, and the second fastening section extends essentially parallel to at least one of the plane (E) and the second end section.

4. The guide arrangement according to claim 1 wherein the first receptacle has a U-shaped cross-section with at least one first base and two first limbs and the second receptacle has a U-shaped cross-section with at least one second base and two second limbs, the first and second receptacles being U-shaped in cross section in the reference plane normal to the plane (E).

5. The guide arrangement according to claim 1, wherein the respective first and second sealing lips of the first and second receptacles are all provided with a friction-reducing flocking or coating.

6. The guide arrangement according to claim 1 wherein the first and second receptacles are both made of an elastomer material.

7. The guide arrangement according to claim 1 comprising a first fastening unit for securing the first receptacle to the first rigid constructional part and a second fastening unit for securing the second receptacle to the second rigid constructional part.

8. The guide arrangement according to claim 1 wherein the first and second window panes are each provided on at least one of their respective first and second outer and inner surfaces with a decorative coating.

9. The guide arrangement according to claim 1 wherein the first and second rigid constructional parts are provided with respective first and second trim strips.

10. The guide arrangement according to claim 9 wherein the first and second trim strips of the first and second rigid constructional parts are both arranged between the first and second window panes and extend essentially in the plane (E) wherein the first and second trim strips include respective first and second outer trim surfaces, and wherein the respective first and second outer surfaces of the first and second window panes and the respective first and second outer trim surfaces of the first and second trim strips extend essentially in a common plane (F).

11. The guide arrangement according to claim 1 wherein the distance (A) is less than 20 mm.

12. A method of assembling the guide arrangement according to claim 1 wherein the first guide part is introduced into the first receptacle in a direction essentially perpendicular to the plane (E) and the second guide part is introduced into the second receptacle in a direction essentially perpendicular to the plane (E), wherein the first guide part is introduced into the first receptacle so that the one of the first sealing lips of the first receptacle engages in the first guiding channel and seals against one of the first end section and the first guide arm and the another of the first sealing lips seals against the side of the first end section that faces away from the first inner surface of the first window and wherein the second guide part is introduced into the second receptacle so that the one of the second sealing lips of the second receptacle engages in the second guiding channel and seals against one of the second end section and the second guide arm and the another of the second sealing lips seals against the side of the second end section that faces away from the second inner surface of the second window.

13. The guide arrangement according to claim 6 wherein the elastomer comprises one of a thermoplastic elastomer and an ethylene-propylene-diene rubber.

14. The guide arrangement according to claim 7 wherein the first fastening unit has at least one first fastening clip and the second fastening unit has at least one second fastening clip.

15. The guide arrangement according to claim 7 wherein each of the first and second fastening units has a glue coating.

16. The guide arrangement according to claim 14 wherein the first fastening clip is received in a first hole in the first receptacle and the second fastening clip is received in a second hole in the second receptacle.

17. The guide arrangement according to claim 16 wherein the first hole of the first receptacle is arranged in the first base of the first receptacle and can be latched into the first rigid constructional part and the second hole of the second receptacle is arranged in the second base of the second receptacle and can be latched into the second rigid constructional part.

18. The guide arrangement according to claim 8 wherein the decorative coating comprises a ceramic print.

19. The guide arrangement according to claim 16 wherein the first fastening clip is received in the first hole of the first receptacle and latches into the first rigid constructional part to secure the first receptacle, and the second fastening clip is received in the second hole of the second receptacle and latches into the second rigid constructional part to secure the second receptacle.

20. The guide arrangement according to claim 1 wherein the first fastening section is glued to the first inner surface of the first window pane and the second fastening section is glued to the second inner surface of the second window pane.

21. The guide arrangement according to claim 11 wherein the distance (A) is less than 10 mm.

* * * * *